(12) United States Patent
Mohamed et al.

(10) Patent No.: US 11,294,509 B2
(45) Date of Patent: Apr. 5, 2022

(54) APPARATUS AND SYSTEM FOR SENSING TOUCH OR PROXIMITY OF AN EXTERNAL OBJECT

(71) Applicant: SILICON WORKS CO., LTD., Daejeon (KR)

(72) Inventors: Mohamed Gamal Ahmed Mohamed, Daejeon (KR); Mun Seok Kang, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 16/863,359

(22) Filed: Apr. 30, 2020

(65) Prior Publication Data

US 2020/0379623 A1 Dec. 3, 2020

(30) Foreign Application Priority Data

May 28, 2019 (KR) .......................... 10-2019-0062373

(51) Int. Cl.
*G06F 3/041* (2006.01)
*G06F 3/044* (2006.01)

(52) U.S. Cl.
CPC ........ *G06F 3/04186* (2019.05); *G06F 3/0448* (2019.05)

(58) Field of Classification Search
CPC ............... G06F 3/04186; G06F 3/0448; G06F 3/04166; G06F 3/0446; G06F 2203/04104
See application file for complete search history.

(56) References Cited

U.S. PATENT DOCUMENTS

| 8,729,911 | B2 | 5/2014 | Maharyta et al. | |
| 9,001,067 | B2 | 4/2015 | Han | |
| 2011/0062971 | A1* | 3/2011 | Badaye | G06F 3/0443 |
| | | | | 324/686 |
| 2013/0257745 | A1* | 10/2013 | Reynolds | G06F 3/041 |
| | | | | 345/173 |
| 2013/0335252 | A1* | 12/2013 | Roberson | G06F 3/0446 |
| | | | | 341/173 |
| 2015/0009171 | A1* | 1/2015 | Shepelev | G06F 3/041662 |
| | | | | 345/174 |
| 2015/0261356 | A1* | 9/2015 | Shepelev | G06F 3/04162 |
| | | | | 345/174 |
| 2015/0370401 | A1* | 12/2015 | Mizuhashi | G02F 1/13338 |
| | | | | 345/174 |

FOREIGN PATENT DOCUMENTS

KR 10-1497405 3/2015

* cited by examiner

*Primary Examiner* — Carolyn R Edwards
(74) *Attorney, Agent, or Firm* — Fenwick & West LLP

(57) ABSTRACT

Multi-driving in touch sensing allows for reduced errors of the touch sensing by grouping touch electrodes according to sizes of their coupling capacitances and multi-driving them by group.

13 Claims, 8 Drawing Sheets

APPARATUS AND SYSTEM FOR SENSING TOUCH OR PROXIMITY OF AN EXTERNAL OBJECT

CROSS REFERENCE TO RELATED APPLICATION

This application claims priority from Republic of Korea Patent Application No. 10-2019-0062373, filed on May 28, 2019, which is hereby incorporated by reference in its entirety.

BACKGROUND

1. Field of Technology

The present disclosure relates to an apparatus for sensing a touch or the proximity of an external object.

2. Description of the Prior Art

Position sensors are generally used as input devices for computers, PDAs (Personal Digital Assistants), media players, video game players, home electric appliances, wireless telephones, public phones, POS (point of sale) terminals, automated teller machines. One of general position sensor types used for such applications is a touch pad sensor, which can easily be found in an input device of, for example, a laptop computer. A user generally operates a touch pad sensor by moving his/her finger, a stylus, or other stimulating objects around a sensing area of the touch pad sensor. Since a stimulating object generates capacitive effects, inductive effects, or other electrical effects in a carrier signal applied to a detecting area, the position or the proximity of the stimulating object in or to the detecting area may be detected. Position information detected by the touch pad sensor may be used to move a cursor or other indicators on a display screen or to scroll what is on a screen, or for other user interface purposes.

Although touch pad sensors have been used for years, engineers keep seeking designs allowing production costs to be reduced and the performance of a touch pad sensor to be improved. Their recent interests have been mainly aimed at reducing the effect of noise generated by a display screen, a power source, radio frequency interference and/or other sources outside a sensor. Noise reducing techniques such as various types of sampling, filtering, signal processing, shielding, etc. have been successfully implemented to various extents.

The code division multiplexing (CDM), which is an effective method for removing noise, has been dealt with by many researchers. The CDM, which is a method of encoding a driving signal in a specific format and decoding a response signal to the driving signal, may be applied to a touch pad sensor.

However, if a touch panel comprises specific zones assigned to a speaker, a camera, or the like, the code division multiplexing method may cause decoding errors.

SUMMARY

An aspect of the present disclosure is to provide a technology of using the CDM method without decoding errors in a touch sensing. Another aspect of the present disclosure is to provide a technology for decreasing touch sensing errors due to capacitance differences between touch electrodes in a multi-driving for a touch sensing. Still another aspect of the present disclosure is to provide a technology of decreasing touch sensing errors due to differences between touch electrodes in an asymmetrical panel. Still another aspect of the present disclosure is to provide a technology of multi-driving touch electrodes by grouping touch electrodes to be divided in different numbers or forming groups such that touch electrodes spaced apart from each other belong to a group.

To this end, in an embodiment, there is provided a touch sensing device comprising: a driving circuit to group a plurality of transmitting electrodes by size of the coupling capacitance and to multi-drive the plurality of transmitting electrodes by group using modulated driving signals; and a receiving circuit to receive a response signal corresponding to the driving signals from a receiving electrode coupled with the plurality of transmitting electrodes by the coupling capacitances and to demodulate the response signal to generate touch data.

In the touch sensing device, the driving signals may be modulated in a CDM method, and the driving signals may be modulated using a perfect code.

In the touch sensing device, the width of the receiving electrode may be non-uniform along the longitudinal direction.

In the touch sensing device, at least two groups may respectively comprise different numbers of transmitting electrodes.

In the touch sensing device, at least one group may comprise at least two transmitting electrodes spaced apart from each other.

In the touch sensing device, the receiving circuit may demodulate the response signal by applying different sizes of matrixes to at least two groups.

In the touch sensing device, transmitting electrodes having the substantially same size of the coupling capacitances may form one group.

In the touch sensing device, transmitting electrodes having the differences of the coupling capacitances therebetween within a predetermined range may form one group.

In the touch sensing device, the receiving circuit may apply different offsets to at least two groups to generate the touch data.

In another embodiment, there is provided a touch sensing system comprising: a touch panel on which transmitting electrodes and receiving electrodes respectively coupled with each other by capacitances are disposed and in a specific zone of which the transmitting electrodes and the receiving electrodes are not disposed; and a touch sensing circuit to sense the proximity or a touch of an external object to the touch panel by dividing the transmitting electrodes into a plurality of groups such that the transmitting electrodes having a capacitance different from others' due to the specific zone are included in a group different from others and multi-driving the transmitting electrodes by group.

In the touch sensing system, the touch panel may have a shape, as a whole, in which the specific zone is excluded from a quadrilateral and the transmitting electrodes and the receiving electrodes may be disposed respectively in a transversal direction and a longitudinal direction of the quadrilateral.

In the touch sensing system, a transmitting electrode having the capacitance different from another's due to the specific zone may have a length shorter or a gross area smaller than another's.

In still another embodiment, there is provided a touch sensing device comprising: a driving circuit to group a plurality of transmitting electrodes by size and to multi-drive the transmitting electrodes by group using modulated driving signals; and a receiving circuit to receive a response signal corresponding to the driving signals from a receiving electrode coupled with the plurality of transmitting electrodes by capacitances and to demodulate the response signal to generate touch data.

In the touch sensing device, each group may include the transmitting electrodes having sizes between which the differences are within a predetermined range.

In still another embodiment, there is provided a touch sensing device comprising: a driving circuit to respectively drive a first group including a first transmitting electrode and a second transmitting electrode and a second group including a third electrode using modulated driving signals; and a receiving circuit to receive a response signal corresponding to the driving signals from a receiving electrode coupled with the first transmitting electrode, the second transmitting electrode, and the third transmitting electrode and to demodulate the response signal to generate touch data.

In the touch sensing device, the sizes of coupling capacitances of the first transmitting electrode and the second transmitting electrode with the receiving electrode are different from the size of a coupling capacitance of the third transmitting electrode therewith, and the first group may be multi-driven.

As described above, according to the present disclosure, it is possible to use the CDM method without decoding errors in the touch sensing. In addition, the present disclosure allows improving touch sensing errors due to the capacitance differences of touch electrodes in the multi-driving for the touch sensing and touch sensing errors due to the differences of touch electrodes in an asymmetrical touch panel. In addition, according to the present disclosure, it is possible to form groups respectively including the different numbers of touch electrodes or including touch electrodes spaced apart from each other to multi-drive them.

DETAILED DESCRIPTION

Figure 1:
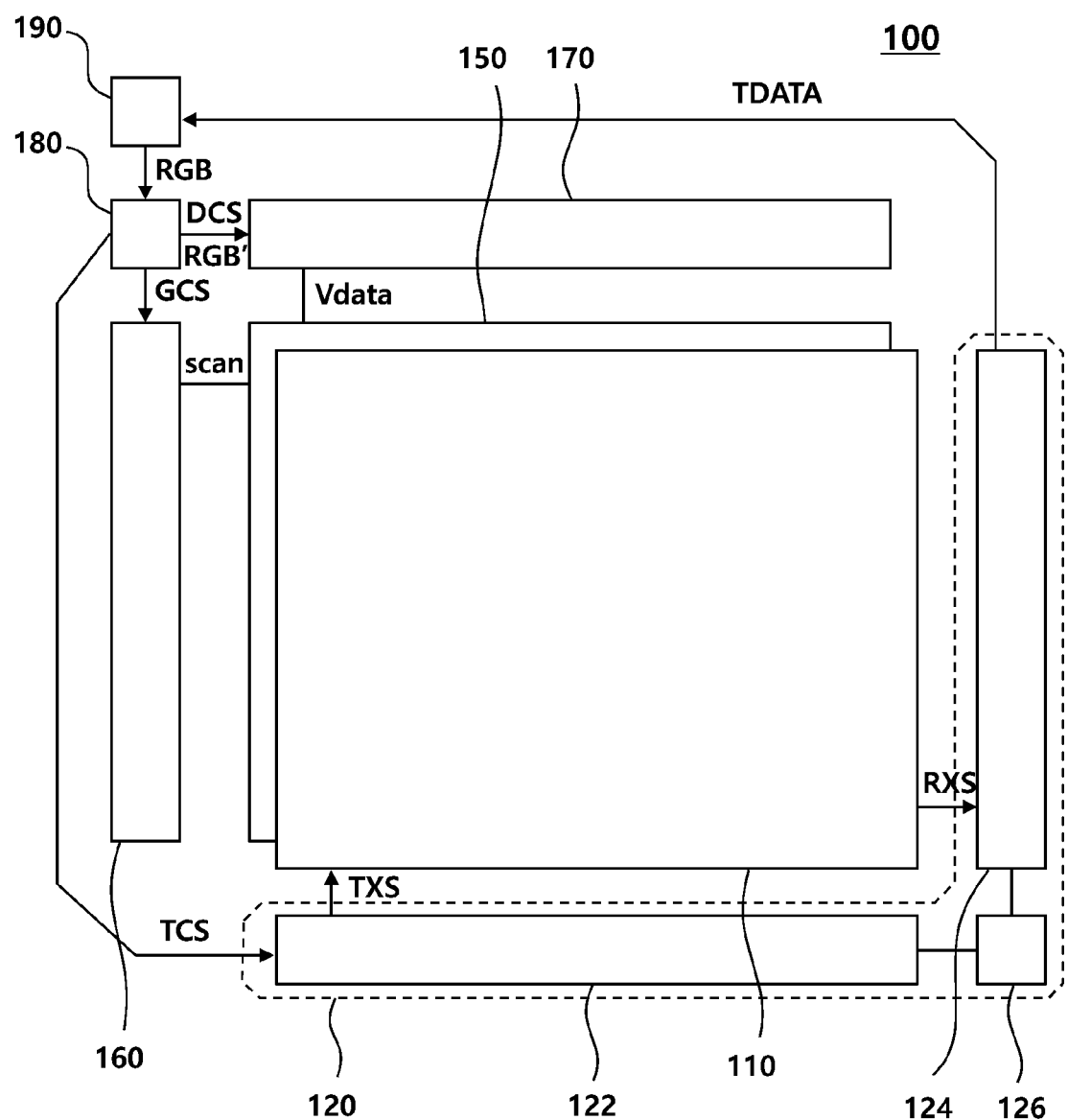
FIG. 1 is a configuration diagram of a display device according to an embodiment.

FIG. 1 is a configuration diagram of a display device according to an embodiment.

Referring to FIG. 1, a display device 100 may comprise a display panel 150, a gate driving device 160, a data driving device 170, a data processing device 180, a host 190, a touch panel 110, and a touch sensing device 120.

The data driving device 170, the gate driving device 160, and the touch sensing device 120 may drive at least one component comprised in the display panel 150 or the touch panel 110. In the display panel 150, the data driving device 170 may drive data lines connected with pixels and the gate driving device 160 may drive gate lines connected with the pixels. The touch sensing device 120 may drive touch electrodes disposed on the touch panel 110.

The data driving device 170 may supply a data voltage Vdata through a data line in order to display an image in each pixel. The data driving device 170 may comprise at least one data driver integrated circuit, and this at least one data driver integrated circuit may be connected to a bonding pad of the display panel 150 in a tape automated bonding (TAB) type or a chip-on-glass (COG) type, directly formed on the display panel 150, or integrated on the display panel 150 depending on cases. In addition, the data driving device 170 may be formed in a chip-on-film (COF) type.

The gate driving device 160 may supply a scan signal through a gate line in order to turn on/off a transistor located in each pixel. The gate driving device 160 may be disposed on one side of the display panel 150 as in FIG. 1, or divided into two to be disposed on both sides of the display panel depending on driving methods. The gate driving device 160 may comprise at least one gate driver integrated circuit, and this at least one gate driver integrated circuit may be connected to a bonding pad of the display panel 150 in a tape automated bonding (TAB) type or a chip-on-glass (COG) type, implemented in a gate in panel (GIP) type to be directly formed on the display panel 150, or integrated on the display panel 150 depending on cases. In addition, the data driving device 170 may be formed in a chip-on-film (COF) type.

The data processing device 180 may receive image data RGB from the host 190 and convert the image data into a format that the data driving device 170 can recognize. In addition, the data processing device 180 may transmit converted image data RGB' to the data driving device 170.

The data processing device 180 may control timings of the driving devices 160, 170, 120 using control signals GCS, DCS, TCS. In such terms, the data processing device 180 may be referred to as a timing controller.

On the touch panel 110, touch electrodes may be disposed. The touch electrodes may comprise transmitting electrodes and receiving electrodes. The touch sensing device 120 may transmit driving signals TXS to the transmitting electrodes and receive a response signal RXS from a receiving electrode to generate touch data TDATA. The touch sensing device 120 may transmit the touch data TDATA to the host 190. The transmitting electrodes and the receiving electrodes may be the same or separate. Although embodiments in which the transmitting electrodes and the receiving electrodes are separate and coupled with each other by capacitances will be described hereinafter, the present disclosure is not limited thereto.

The touch sensing device 120 may comprise a driving circuit 122, a receiving circuit 124, and a controlling circuit 126. The driving circuit 122 may transmit driving signals TXS to the transmitting electrodes and the receiving circuit 124 may receive response signals RXS from the receiving electrodes. The controlling circuit 126 may transmit timing signals to the driving circuit 122 and the receiving circuit 124.

The touch sensing device 120 may form a touch system together with the touch panel 110.

Figure 2:
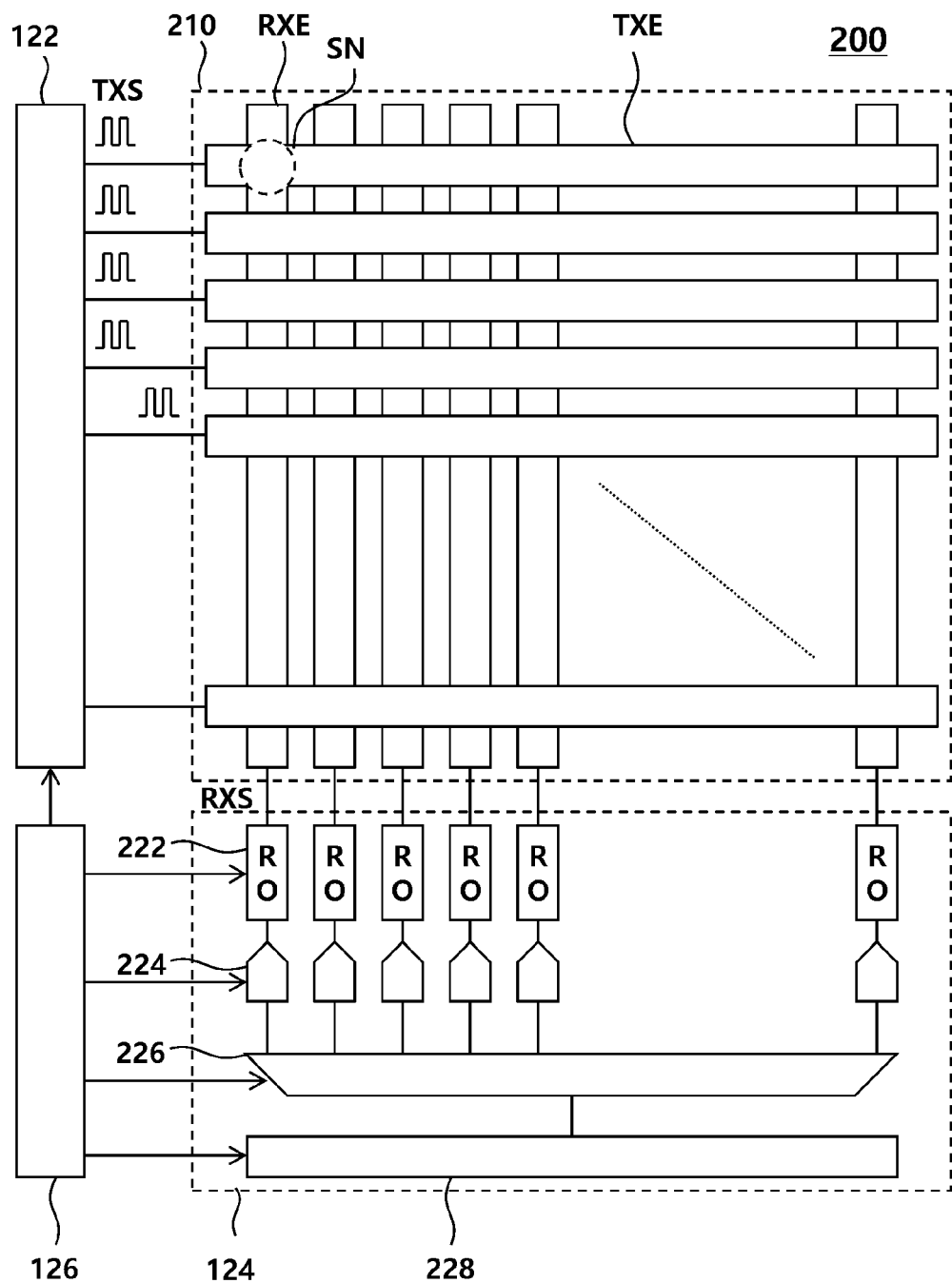
FIG. 2 is a configuration diagram of an example of a touch system according to an embodiment.

FIG. 2 is a configuration diagram of an example of a touch system 200 according to an embodiment.

Referring to FIG. 2, on a touch panel 210, transmitting electrodes TXE and receiving electrodes RXE may be disposed. The transmitting electrodes TXE and the receiving electrodes RXE may be disposed respectively in a transversal direction and a longitudinal direction to intersect with each other. The touch panel 210 may have a quadrilateral shape as a whole, however, the present disclosure is not limited thereto.

The driving circuit 122 may supply driving signals TXS to the transmitting electrodes TXE. The receiving circuit 124 may receive response signals RXS from the receiving electrodes RXE and demodulate the response signals RXS to generate touch data TDATA. The transmitting electrodes TXE and the receiving electrodes RXE may be coupled with each other by capacitances, and the driving signals TXS supplied to the transmitting electrodes TXE may induce response signals RXS from the receiving electrodes RXE through the coupling capacitances.

The driving circuit 122 may multi-drive a plurality of transmitting electrodes TXE. Here, multi-driving may mean simultaneously driving the plurality of transmitting electrodes TXE. When a touch system 200 uses multi-driving, since a plurality of transmitting electrodes TXE may simultaneously be driven, the total time for the touch driving may be shortened and the touch sensitivity may be improved by making the length of a transmitting signal TXS supplied to each transmitting electrode TXE longer.

The driving circuit 122 may divide the transmitting electrodes TXE into a plurality of groups and multi-drive the transmitting electrodes TXE by group. For example, in a case when the number of the entire transmitting electrodes TXE disposed on the touch panel 210 is 48, the driving circuit 122 may divide the transmitting electrodes TXE into 12 groups by distributing 4 transmitting electrodes TXE in each group. The driving circuit 122 may simultaneously drive the 4 transmitting electrodes assigned in each group.

The driving circuit 122 may simultaneously transmit driving signals modulated to be orthogonal to each other respectively to the transmitting electrodes TXE belonging to one group. Even though a plurality of driving signals RXS modulated to each other orthogonal in one response signal RXS, they may be separated through a demodulation process. The receiving circuit 124 may separate influences of the driving signals TXS by demodulating the response signal RXS received through the receiving electrode RXE.

The driving circuit 122 may apply a time division driving to each group. The driving circuit 122 may multi-drive a first group in a first time period and a second group in a second time period that does not overlap with the first time period.

The receiving circuit 124 may comprise a readout circuit 222, an analog-digital converter (ADC) 224, a multiplexer (MUX) 226, and a processing circuit 228.

The readout circuit 222, which is to convert a response signal RXS to be analog, may comprise a circuit such as an integrator. The analog-digital converter 224 may convert an output from the readout circuit 222 into sensing data. The MUX 226 may transfer sensing data generated in a plurality of channels to the processing circuit 228. The processing circuit 228 may process the sensing data to generate touch data.

The controlling circuit 226 may transmit timing signals to the driving circuit 122 and the receiving circuit 124. The driving circuit 122 and the receiving circuit 124 may transmit driving signals TXS and receive response signals RXS in accordance with such timing signals.

The touch system 200 may use a code division multiplexing (CDM) technique as an example of the multi-driving.

The driving circuit 122 may generate driving signals TXS using a modulation matrix satisfying the CDM and transmit them respectively to transmitting electrodes TXE. The receiving circuit 124, particularly, the processing circuit 228 may generate touch data by applying a demodulation matrix to sensing data generated depending on response signals RXS. Such processing in the driving circuit 122 is also referred to as a data encoding and the processing in the receiving circuit 124 is also referred to as a data decoding.

Figure 3:
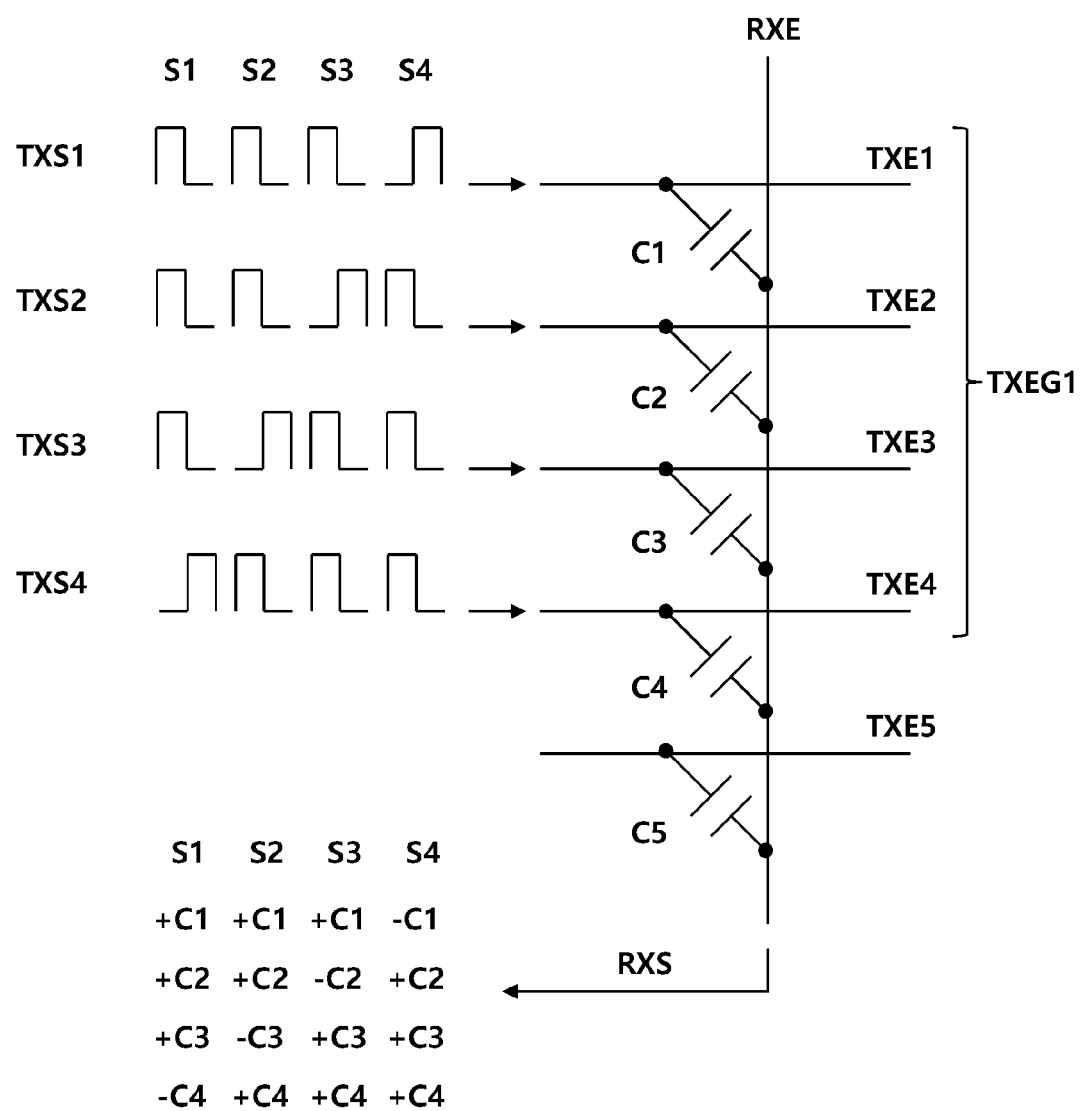
FIG. 3 is an example of a data encoding and a data encoding in a touch system according to an embodiment.

FIG. 3 is an example of a data encoding and a data decoding in a touch system according to an embodiment.

Each of driving signals TXS1~TXS4 may be divided into N sequences. N is a natural number and 4 in the example of FIG. 3. The driving signals TXS1~TXS4 may have specific code values respectively corresponding to the sequences. In the example of FIG. 3, a first driving signal TXS1 may have a code value of (+1) in a first sequence S1 and a code value of (−1) in a fourth sequence S4. Each code value may be generated by a phase modulation (PM), an amplitude modulation (AM), a frequency modulation (FM), etc. In the example of FIG. 3, the code values are generated by the phase modulation (PM). A square wave having a phase shift of 0° is defined as (+1) and a square wave having a phase shift of 180° is defined as (−1).

Referring to FIG. 3, driving signals TXS1~TXS4 corresponding to a perfect code are simultaneously transmitted to transmitting electrodes TXE1~TXE4. In the first sequence S1, square waves having a phase shift of 0° indicating (+1) are transmitted to a first transmitting electrode TXE1, a second transmitting electrode TXE2, and a third transmitting electrode TXE3, and a square wave having a phase shift of 180° indicating (−1) to a fourth transmitting electrode TXE4.

When each driving signal TXS1~TXS4 transmitted to each transmitting electrode TXE1~TXE4 in each sequence S1~S4 is referred to as a code, each response signal RXS of a receiving electrode RXE coupled with the transmitting electrodes TXE1~TXE4 by capacitances or sensing data for the response signal RXS may be expressed as a sum of coupling capacitances C1~C4 to which the codes are applied.

For example, sensing data Si for a response signal RXS in the first sequence S1 may be expressed as $(+1)C_1+(+1)C_2+(+1)C_3+(-1)C_4$.

When generally expressing, sensing data Si in an ith sequence may be expressed as equation 1.

$$S_i = M_{i,1}C_1 + M_{i,1}C_2 + \ldots + M_{i,1}C_L \quad \text{[Equation 1]}$$

Here, i is a natural number and L is a natural number, which is the number of multi-driven driving signals. A matrix of codes transmitted to the transmitting electrodes TXE1 TXE4 in all the sequences S1~S4 may be referred to as a modulation matrix M, and each code may be expressed as $M_{i,j}$. Here, j indicates an order of one of the multi-driven driving signals.

The receiving circuit may receive response signals of all the sequences S1~S4, store them as sensing data, and generate demodulated data by applying an inverse matrix of the modulation matrix M as a demodulation matrix to the sensing data.

When expressing this as a general equation, it may be expressed as equation 2.

$$[M][C] = [S]$$

$$[S][M]^T = D \quad \text{[Equation 2]}$$

Here, M is a modulation matrix, S is sensing data, C is coupling capacitances, and D is demodulated data.

An example, in which a perfect code for four transmitting electrodes TXE1~TXE4 is applied, is as follows.

$$M = \begin{Bmatrix} 1 & 1 & 1 & -1 \\ 1 & 1 & -1 & 1 \\ 1 & -1 & 1 & 1 \\ -1 & 1 & 1 & 1 \end{Bmatrix} \quad \text{[Equation 3]}$$

$$\begin{Bmatrix} 1 & 1 & 1 & -1 \\ 1 & 1 & -1 & 1 \\ 1 & -1 & 1 & 1 \\ -1 & 1 & 1 & 1 \end{Bmatrix} \begin{pmatrix} C_1 \\ C_2 \\ C_3 \\ C_4 \end{pmatrix} = \begin{pmatrix} C_1 + C_2 + C_3 - C_4 \\ C_1 + C_2 - C_3 + C_4 \\ C_1 - C_2 + C_3 + C_4 \\ -C_1 + C_2 + C_3 + C_4 \end{pmatrix}$$

$$\begin{Bmatrix} 1 & 1 & 1 & -1 \\ 1 & 1 & -1 & 1 \\ 1 & -1 & 1 & 1 \\ -1 & 1 & 1 & 1 \end{Bmatrix}^T \begin{pmatrix} C_1 + C_2 + C_3 - C_4 \\ C_1 + C_2 - C_3 + C_4 \\ C_1 - C_2 + C_3 + C_4 \\ -C_1 + C_2 + C_3 + C_4 \end{pmatrix} = 4 \begin{pmatrix} C_1 \\ C_2 \\ C_3 \\ C_4 \end{pmatrix}$$

When an external object approaches or touches a touch panel, the sizes of the coupling capacitances are changed, a touch sensing device senses the change of the sizes of the coupling capacitances, thereby generating touch data indicating the proximity or the touch of the external object.

Figure 4:
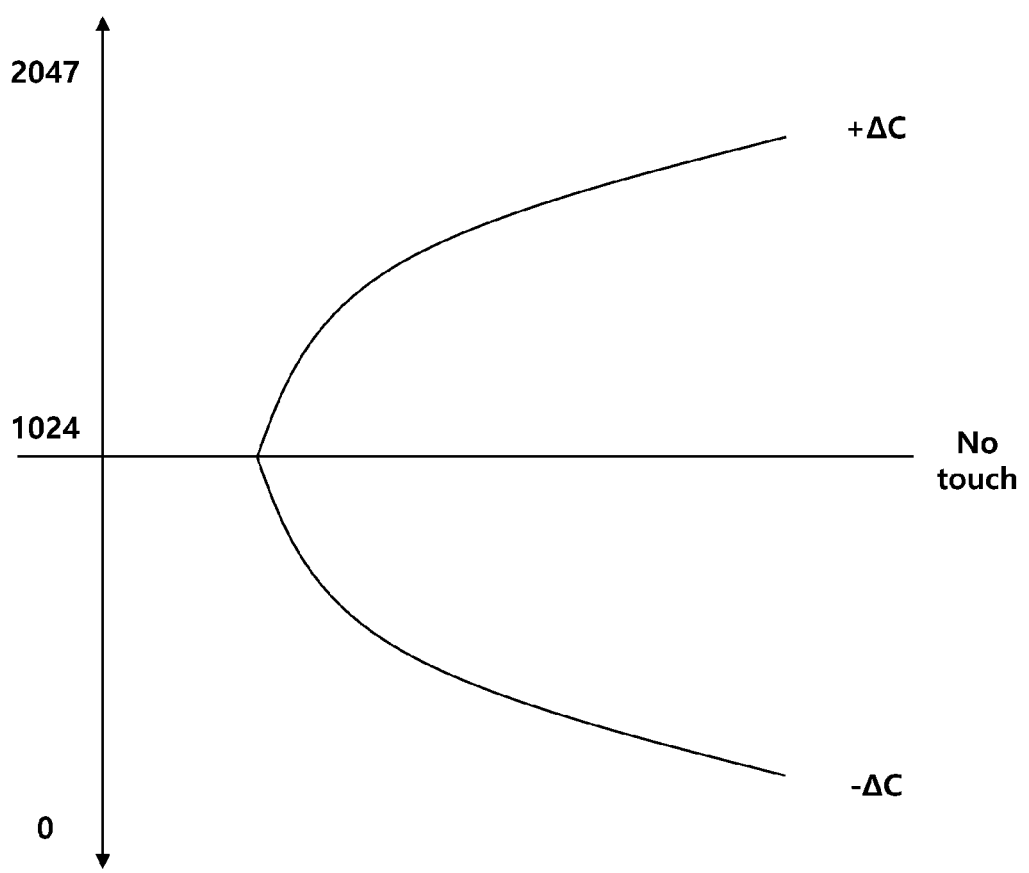
FIG. 4 is a diagram showing a change of sensing data according to the proximity or a touch of an external object.

FIG. 4 is a diagram showing a change of sensing data according to the proximity or a touch of an external object.

The readout circuit of the touch sensing device may convert the change of the size of a coupling capacitance into an analog signal and output the signal to the analog-digital converter. Here, the readout circuit is generally designed to output a median value of a range of values input to the analog-digital converter when there is no proximity or touch of an external object. Such design allows, as shown in FIG. 4, the increase or decrease of a coupling capacitance to be efficiently converted in the analog-digital converter without being saturated.

Sensing data $S_i$ in an ith sequence reflecting the change of the size of a coupling capacitance may be expressed as equation 4.

$$S_i = M_{i,1}(C_1 + \Delta C_1) + M_{i,1}(C_2 + \Delta C_2) + \ldots + M_{i,1}(C_L + \Delta C_L) \quad \text{[Equation 4]}$$

In a case when a perfect code of 4×4 as a modulation matrix is used and the sizes of coupling capacitances are equal when there is no proximity or touch of an external object, sensing data may be expressed as the right side of equation 5 and demodulation data may be expressed as the right side of equation 6.

$$\begin{Bmatrix} 1 & 1 & 1 & -1 \\ 1 & 1 & -1 & 1 \\ 1 & -1 & 1 & 1 \\ -1 & 1 & 1 & 1 \end{Bmatrix} \begin{pmatrix} C + \Delta C_1 \\ C + \Delta C_2 \\ C + \Delta C_3 \\ C + \Delta C_4 \end{pmatrix} = \quad \text{[Equation 5]}$$

$$\begin{pmatrix} 2C + \Delta C_1 + \Delta C_2 + \Delta C_3 - \Delta C_4 \\ 2C + \Delta C_1 + \Delta C_2 - \Delta C_3 + \Delta C_4 \\ 2C + \Delta C_1 - \Delta C_2 + \Delta C_3 + \Delta C_4 \\ 2C - \Delta C_1 + \Delta C_2 + \Delta C_3 + \Delta C_4 \end{pmatrix}$$

$$\begin{Bmatrix} 1 & 1 & 1 & -1 \\ 1 & 1 & -1 & 1 \\ 1 & -1 & 1 & 1 \\ -1 & 1 & 1 & 1 \end{Bmatrix}^T \begin{pmatrix} 2C + \Delta C_1 + \Delta C_2 + \Delta C_3 - \Delta C_4 \\ 2C + \Delta C_1 + \Delta C_2 - \Delta C_3 + \Delta C_4 \\ 2C + \Delta C_1 - \Delta C_2 + \Delta C_3 + \Delta C_4 \\ 2C - \Delta C_1 + \Delta C_2 + \Delta C_3 + \Delta C_4 \end{pmatrix} = \quad \text{[Equation 6]}$$

$$\begin{pmatrix} 4C + 4\Delta C_1 \\ 4C + 4\Delta C_2 \\ 4C + 4\Delta C_3 \\ 4C + 4\Delta C_4 \end{pmatrix}$$

In such a case, the demodulation data may have a uniform offset, for example 2C, and be expressed as a value proportional to the size change of each coupling capacitance. This corresponds to a case when the sizes of the coupling capacitances are equal without a touch or the proximity of an external object. In a case when the sizes of the coupling capacitances are different, an offset of the demodulation data for each cell may be different. Here, a cell is a unit in which sensing data or demodulation data distinguished from each other is generated. A cell may be formed in every zone where a transmitting electrode and a receiving electrode intersect. In a case when a transmitting electrode and a receiving electrode are the same, one transmitting electrode or one receiving electrode may form a cell.

Figure 5:
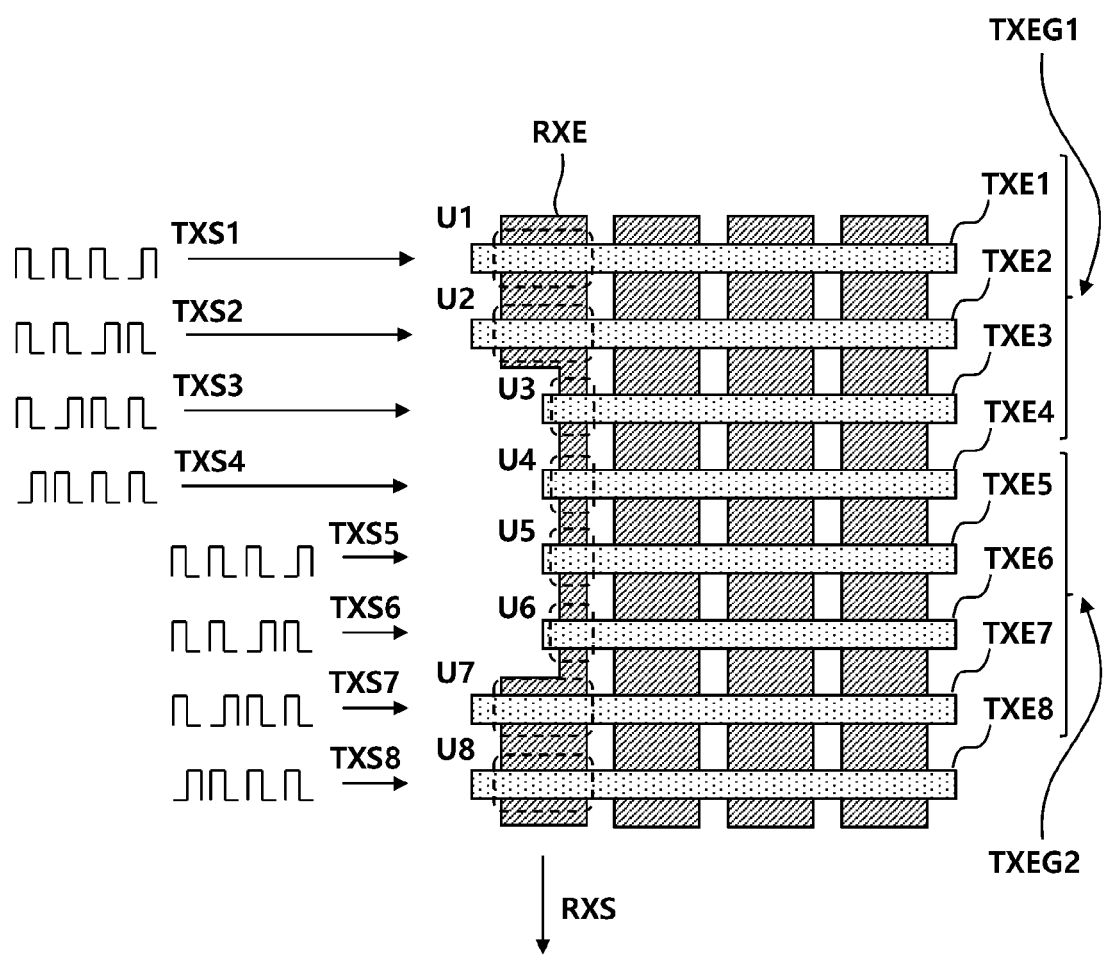
FIG. 5 is a diagram illustrating the difference between offsets generated when multi-driving cells having different coupling capacitances.

FIG. 5 is a diagram illustrating the difference of offsets generated when multi-driving cells having different coupling capacitances.

Referring to FIG. 5, a first cell U1 to an eighth cell U8 are formed in zones where transmitting electrodes TXE1~TXE8 intersect with a receiving electrode RXE. The sizes of coupling capacitances formed in the cells U1~U8 are proportional to the areas of the zones where the transmitting electrodes TXE1~TXE8 intersect with the receiving electrode RXE. According to this, the sizes of coupling capacitances of a third cell U3 to a sixth cell U6 are smaller than the sizes of coupling capacitances of the first cell U1, a second cell U2, a seventh cell U7, and the eighth cell U8. If the sizes of the coupling capacitances of the first cell U1, the second cell U2, the seventh cell U7, and the eighth cell U8 are referred to as Ca and the sizes of the coupling capacitances of the third cell U3 to the sixth cell U6 are referred to as Cb, sensing data and demodulation data for the first cell U1 to a fourth cell U4 included in a first group TXEG1 may be expressed as equation 7 and equation 8.

$$\begin{Bmatrix} 1 & 1 & 1 & -1 \\ 1 & 1 & -1 & 1 \\ 1 & -1 & 1 & 1 \\ -1 & 1 & 1 & 1 \end{Bmatrix} \begin{pmatrix} C_a + \Delta C_1 \\ C_a + \Delta C_2 \\ C_b + \Delta C_3 \\ C_b + \Delta C_4 \end{pmatrix} = \quad \text{[Equation 7]}$$

$$\begin{pmatrix} 2C_a + \Delta C_1 + \Delta C_2 + \Delta C_3 - \Delta C_4 \\ 2C_a + \Delta C_1 + \Delta C_2 - \Delta C_3 + \Delta C_4 \\ 2C_b + \Delta C_1 - \Delta C_2 + \Delta C_3 + \Delta C_4 \\ 2C_b - \Delta C_1 + \Delta C_2 + \Delta C_3 + \Delta C_4 \end{pmatrix}$$

-continued $$\left\{\begin{pmatrix} 1 & 1 & 1 & -1 \\ 1 & 1 & -1 & 1 \\ 1 & -1 & 1 & 1 \\ -1 & 1 & 1 & 1 \end{pmatrix}\right\}^T \left\{\begin{pmatrix} 2C_a + \Delta C_1 + \Delta C_2 + \Delta C_3 - \Delta C_4 \\ 2C_a + \Delta C_1 + \Delta C_2 - \Delta C_3 + \Delta C_4 \\ 2C_b + \Delta C_1 - \Delta C_2 + \Delta C_3 + \Delta C_4 \\ 2C_b - \Delta C_1 + \Delta C_2 + \Delta C_3 + \Delta C_4 \end{pmatrix}\right\} =$$ [Equation 8]

$$\begin{pmatrix} 4C_a + 4\Delta C_1 \\ 4C_a + 4\Delta C_2 \\ 4C_b + 4\Delta C_3 \\ 4C_b + 4\Delta C_4 \end{pmatrix}$$

As shown in the right side of equation 8, demodulation data for the first cell U1 and that for the third cell U3 may have different offsets. Such a difference between offsets may cause an error in touch data and lead to a saturation of the analog-digital converter or require an analog-digital converter having a larger range of input values.

Such a problem is not unique to the first group TXEG1. The same problem may occur in a second group TXEG2. Since the coupling capacitances of a fifth cell U5 and the sixth cell U6 are smaller than the coupling capacitances of the seventh cell U7 and the eighth cell U8, the same problem may occur.

In order to resolve the above-described problem, a touch sensing device and/or a touch sensing system according to an embodiment may group transmitting electrodes according to the sizes of the coupling capacitances and multi-drive by group using modulated driving signals.

Figure 6:
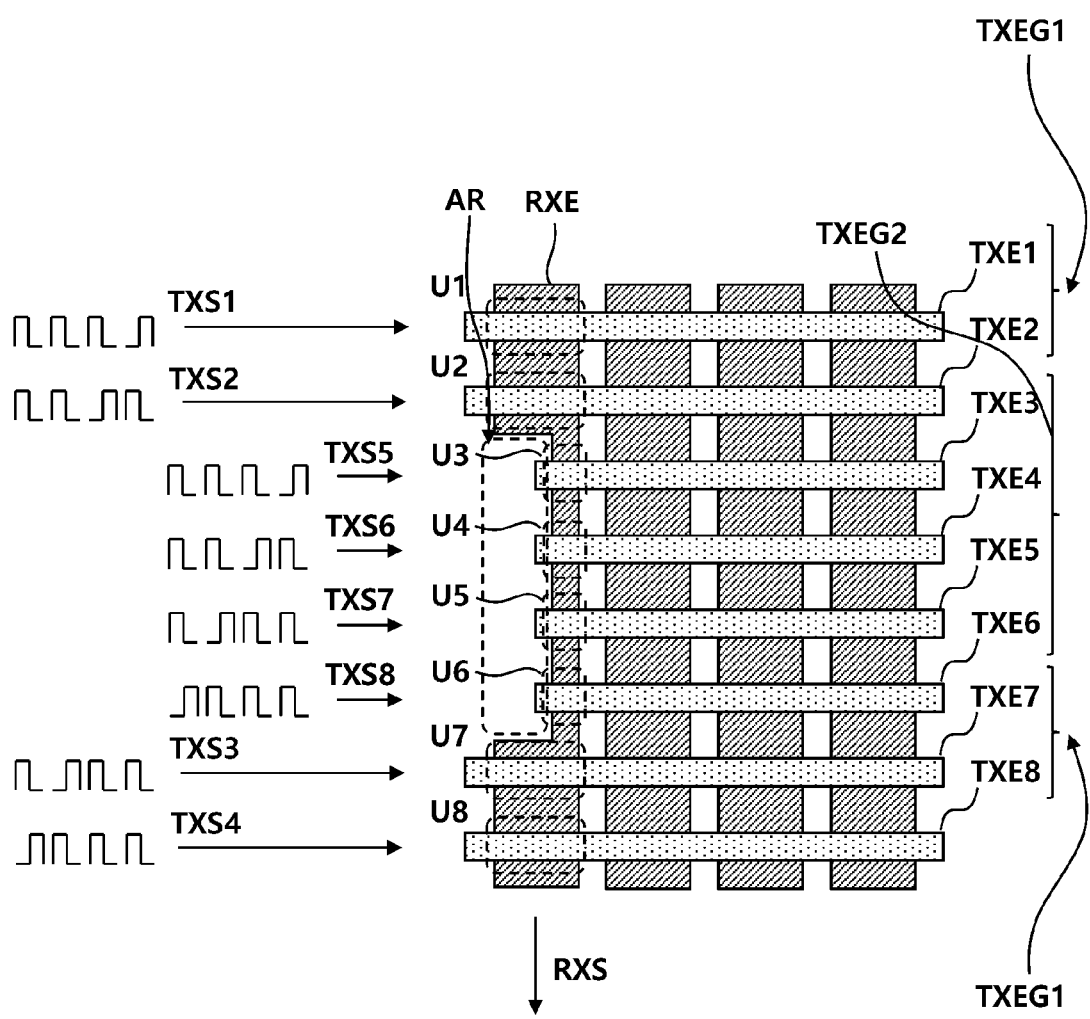
FIG. 6 is a diagram illustrating a first example of a grouping method of transmitting electrodes according to an embodiment.

FIG. 6 is a diagram illustrating a first example of a grouping method of transmitting electrodes according to an embodiment.

Referring to FIG. 6, in a touch sensing device and/or a touch sensing system, a first transmitting electrode TXE1, a second transmitting electrode TXE2, a seventh transmitting electrode TXE7, and an eighth transmitting electrode TXE8 may be grouped in a first group TXEG1, and a third transmitting electrode TXE3 to a sixth transmitting electrode TXE6 may be grouped in a second group TXEG2 according to the sizes of coupling capacitances of the transmitting electrodes. As in such an example, a touch sensing device and/or a touch sensing system may comprise groups each of which includes transmitting electrodes having the practically same size of coupling capacitances. Otherwise, a touch sensing device and/or a touch sensing system may comprise groups each of which includes transmitting electrodes having coupling capacitances between which the differences are within a predetermined range.

The reason why the sizes of the coupling capacitances are different may be that the width of a receiving electrode RXE is longitudinally non-uniform as shown in FIG. 6. In a case when other components, such as a camera, a button, a speaker, are disposed in a specific area AR of a touch panel, neither transmitting electrode nor receiving electrode may be disposed in that specific area AR. Such a specific area may make a receiving electrode RXE be longitudinally non-uniform and the size of a coupling capacitance of every transmitting electrode be different from another's.

In a touch sensing device and/or a touch sensing system in which transmitting electrodes are divided in a plurality of groups, transmitting electrodes having a coupling capacitance different from another's due to the specific area AR may be grouped in a group different from the other groups. As in the example of FIG. 6, the third transmitting electrode TXE3 to the sixth transmitting electrode TXE6 having a different coupling capacitance due to the specific area AR may be grouped in the second group TXEG2 and the first transmitting electrode TXE1, the second transmitting electrode TXE2, the seventh transmitting electrode TXE7, and the eighth transmitting electrode TXE8 may be grouped in the first group TXEG1.

A touch panel may have a shape, as a whole, in which the specific zone is excluded from a quadrilateral and the transmitting electrodes TXE1~TXE8 and the receiving electrodes RXE may be disposed respectively in a transversal direction and a longitudinal direction of the quadrilateral. In such a touch panel, a transmitting electrode having a coupling capacitance different from another transmitting electrode's coupling capacitance due to the specific zone may have a length shorter or a gross area smaller than another transmitting electrode.

When the transmitting electrodes are grouped according to the sizes of the coupling capacitances, the sizes of the offsets of the sensing data and/or the demodulation data for at least two groups may be different from each other. In a touch sensing device and/or a touch sensing system, touch data may be generated by removing offsets from sensing data and/or demodulation data. In such a case, touch data may be generated by applying different offsets to the at least two groups.

Figure 7:
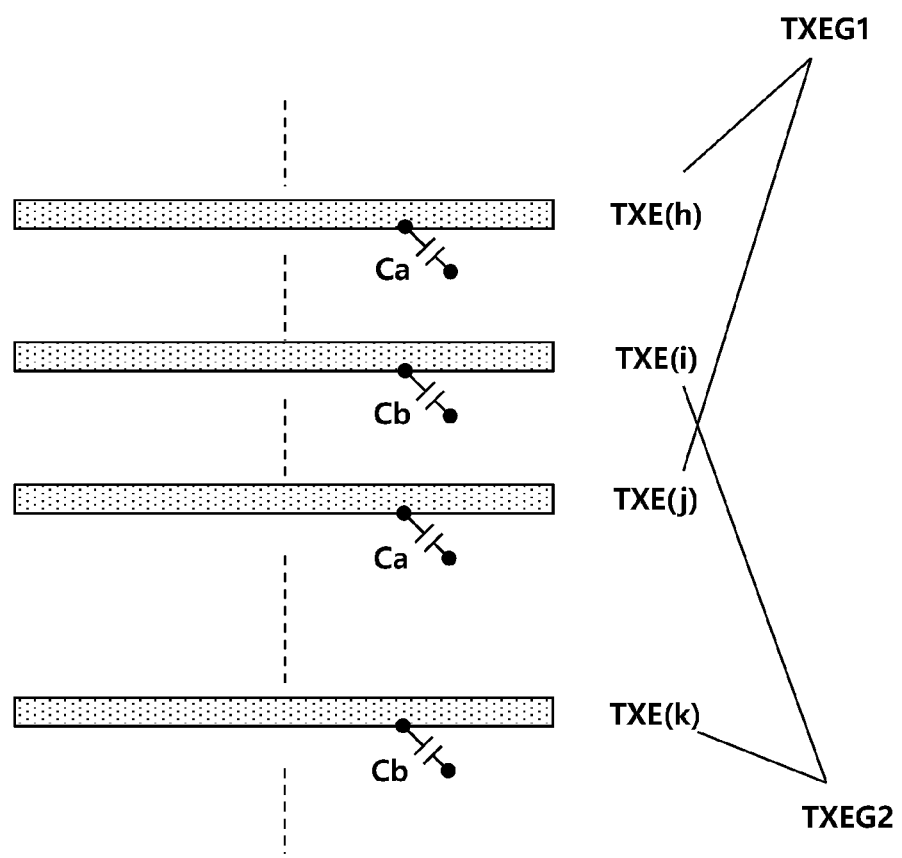
FIG. 7 is a diagram illustrating a second example of a grouping method of transmitting electrodes according to an embodiment.

FIG. 7 is a diagram illustrating a second example of a grouping method of transmitting electrodes according to an embodiment.

Referring to FIG. 7, in a touch sensing device and/or a touch sensing system, transmitting electrodes may be grouped such that at least one group comprises at least two transmitting electrodes spaced apart from each other. For example, a first group TXEG1 may comprise two transmitting electrodes TXE(h) and TXE(j) spaced apart from each other and a second group TXEG2 may comprise two transmitting electrodes TXE(i) and TXE(k) spaced apart from each other.

In a touch sensing device and/or a touch sensing system, transmitting electrodes may be grouped such that at least two groups respectively comprise different numbers of the transmitting electrodes. For example, the number of the transmitting electrodes belonging to the first group TXEG1 may be greater than the number of the transmitting electrodes belonging to the second group TXEG2. Here, to these at least two groups, different sizes of matrixes, for example modulation matrix and/or demodulation matrix, may be applied.

There may be a group including one transmitting electrode. For example, the first group TXEG1 may include two transmitting electrodes, whereas the second group TXEG2 includes one.

Figure 8:
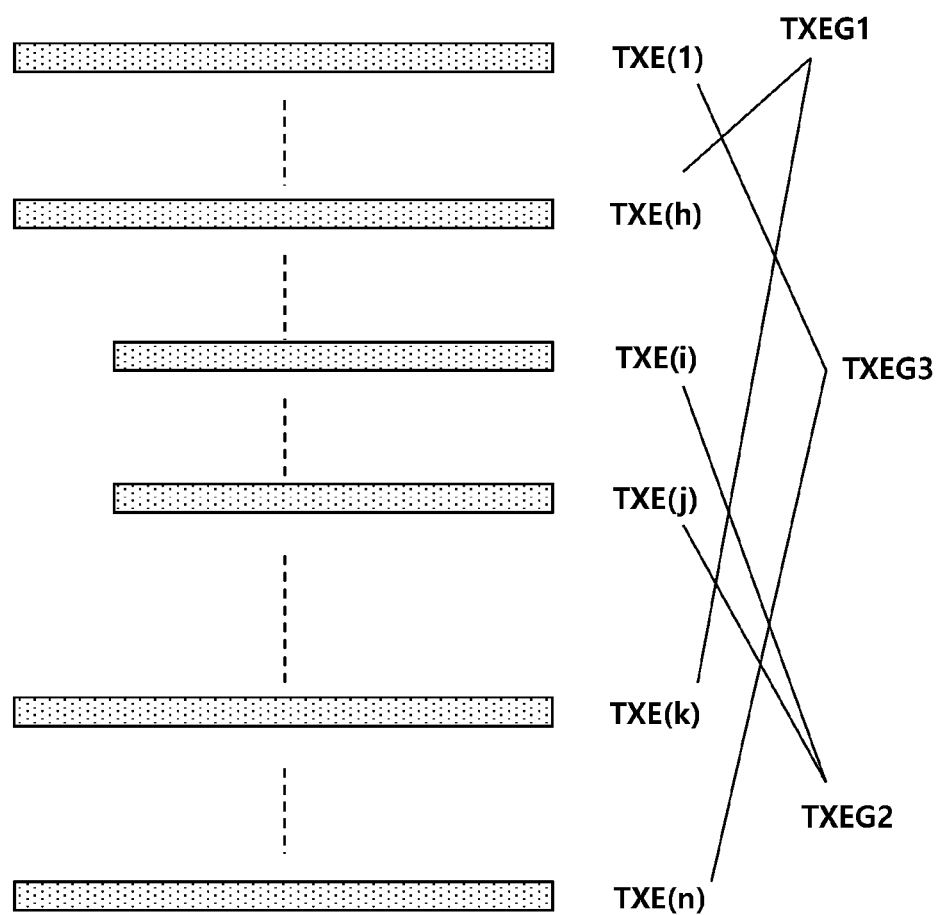
FIG. 8 is a diagram illustrating a third example of a grouping method of transmitting electrodes according to an embodiment.

FIG. 8 is a diagram illustrating a third example of a grouping method of transmitting electrodes according to an embodiment.

Referring to FIG. 8, in a touch sensing device and/or a touch sensing system, transmitting electrodes may be grouped according to their sizes and/or their locations.

For example, transmitting electrodes TXE(h) and TXE(k) both having a first length may be grouped in one group and transmitting electrodes TXE(i) and TXE(j) having a second length different from the first length may be grouped in another group.

In addition, in spite of having the same length, transmitting electrodes TXE(1) and TXE(n) located at both ends of a touch panel may be grouped in a third group TXEG3, whereas the transmitting electrodes TXE(h) and TXE(j) located in an inner portion of the touch panel may be grouped in the first group TXEG1.

A transmitting electrode may have a coupling capacitance different from another transmitting electrode coupling capacitance depending on its size and/or location. However, even though the sizes of the coupling capacitances are not different from each other, the transmitting electrodes may be grouped according to their sizes and/or locations.

As described above, according to the present disclosure, it is possible to use the CDM method without decoding errors in a touch sensing. In addition, according to the present disclosure, it is possible to reduce touch sensing errors due to capacitance differences between touch electrodes in a multi-driving for a touch sensing and touch sensing errors due to differences between touch electrodes in an asymmetrical panel. Still according to the present disclosure, it is possible to multi-drive touch electrodes by grouping touch electrodes to be divided in different numbers or forming one group with touch electrodes spaced apart from each other.

What is claimed is:

1. A touch sensing device comprising:
    a driving circuit to group a plurality of transmitting electrodes into a first group and a second group according to sizes of their coupling capacitances and to drive the plurality of transmitting electrodes of the first group and the second group using modulated driving signals; and
    a receiving circuit to receive a response signal corresponding to the modulated driving signals from a receiving electrode coupled with the plurality of transmitting electrodes by the coupling capacitances and to demodulate the response signal and generate touch data by reflecting a size of a coupling capacitance of each transmitting electrode,
    wherein the first group comprises a plurality of first transmitting electrodes, the second group comprises a plurality of second transmitting electrodes, the plurality of first transmitting electrodes have a first coupling capacitance substantially equal to each other, the plurality of second transmitting electrodes have a second coupling capacitance substantially equal to each other, and the first coupling capacitance is different from the second coupling capacitance,
    wherein the driving circuit drives the plurality of first transmitting electrodes simultaneously, and drive the plurality of second transmitting electrodes simultaneously.

2. The touch sensing device of claim 1, wherein the modulated driving signals are modulated in a code division multiplexing (CDM) method.

3. The touch sensing device of claim 2, wherein the modulated driving signals are modulated using a perfect code.

4. The touch sensing device of claim 1, wherein a width of the receiving electrode is non-uniform along a longitudinal direction.

5. The touch sensing device of claim 1, wherein the first group and the second group respectively comprise different numbers of transmitting electrodes.

6. The touch sensing device of claim 1, wherein, between transmitting electrodes belonging to the first group, a transmitting electrode belonging to the second group is disposed.

7. The touch sensing device of claim 1, wherein the receiving circuit demodulates the response signal by applying different sizes of matrixes to the first group and the second group.

8. The touch sensing device of claim 1, wherein transmitting electrodes having a substantially same size of the coupling capacitances form one group.

9. The touch sensing device of claim 1, wherein transmitting electrodes from the plurality of transmitting electrodes, having the coupling capacitances between which differences are within a predetermined range, form one group.

10. The touch sensing device of claim 1, wherein the receiving circuit applies different offsets to the first group and the second group to generate the touch data.

11. A touch sensing system comprising:
    a touch panel on which transmitting electrodes and receiving electrodes respectively coupled with each other by capacitances are disposed and in a specific zone of which the transmitting electrodes and the receiving electrodes are not disposed; and
    a touch sensing circuit to sense a proximity or a touch of an external object to the touch panel by dividing the transmitting electrodes into a first group and a second group driving the transmitting electrodes by group, and generating touch data by reflecting a size of a capacitance of each transmitting electrode,
    wherein the first group comprises a plurality of first transmitting electrodes, the second group comprises a plurality of second transmitting electrodes, the plurality of first transmitting electrodes have a first coupling capacitance substantially equal to each other, the plurality of second transmitting electrodes have a second coupling capacitance substantially equal to each other, and the first coupling capacitance is different from the second coupling capacitance,
    wherein the touch sensing circuit drives the plurality of first transmitting electrodes simultaneously, and drives the plurality of second transmitting electrodes simultaneously.

12. The touch sensing system of claim 11, wherein the touch panel is a quadrilateral as a whole and the transmitting electrodes and the receiving electrodes are disposed respectively in a transversal direction and a longitudinal direction of the quadrilateral.

13. The touch sensing system of claim 11, wherein a transmitting electrode having a capacitance different from another transmitting electrode's capacitance due to the specific zone has a length shorter or a gross area smaller than those of another transmitting electrode.

* * * * *